United States Patent [19]
Roberts

[11] Patent Number: 6,140,920
[45] Date of Patent: Oct. 31, 2000

[54] OPTICAL TRANSMISSION SYSTEM ELEMENT TEST

[75] Inventor: Kim Byron Roberts, Welwyn Garden City, United Kingdom

[73] Assignee: Nortel Networks Limited, Montreal, Canada

[21] Appl. No.: 08/893,337

[22] Filed: Jul. 16, 1997

[30] Foreign Application Priority Data

Aug. 6, 1996 [GB] United Kingdom .................... 9616538

[51] Int. Cl.⁷ ..................................................... G08B 29/00
[52] U.S. Cl. .................... 340/514; 340/825.16; 359/110; 359/143; 370/241
[58] Field of Search ..................................... 340/514, 516, 340/507, 511, 518, 531, 555–557, 825.16; 364/184–186; 371/22.5; 370/241–243, 907; 359/110, 143

[56] References Cited

U.S. PATENT DOCUMENTS

| | | | |
|---|---|---|---|
| 5,224,128 | 6/1993 | Grallert | 359/110 |
| 5,504,611 | 4/1996 | Carborne, Jr. et al. | 359/177 |
| 5,508,690 | 4/1996 | Shur et al. | 340/825.16 |
| 5,517,519 | 5/1996 | Carborne, Jr. et al. | 379/113 |
| 5,818,343 | 10/1998 | Sobel et al. | 340/815.65 |

FOREIGN PATENT DOCUMENTS

WO96/06640   6/1990   WIPO .

*Primary Examiner*—Donnie L. Crosland
*Attorney, Agent, or Firm*—Lee, Mann, Smith, McWilliams, Sweeney & Ohlson

[57] ABSTRACT

A field replaceable element of an optical transmission system includes an operating unit (1), a self test means (2), and non volatile memory (3) for storing self test results on-board. Parameters of the internal operation of the unit may be stored, to facilitate long term analysis of component ageing, and to facilitate diagnosis of faults.

15 Claims, 6 Drawing Sheets

OPTICAL TRANSMISSION SYSTEM ELEMENT TEST

FIELD OF THE INVENTION

The present invention relates to field replaceable elements of optical transmission systems, to elements for handling data traffic within optical transmission systems, to optical transmission systems, to systems for gathering self test data and to methods of operating elements of optical transmission systems.

BACKGROUND TO THE INVENTION

In optical transmission systems, particularly high capacity ones such as 2.5 or 10 Gb/s systems, and those incorporating optical amplifiers, there are typically new devices used within the plug-in units that compose the systems. New devices do not have an extensive history, and so conservative estimates must be used for the amount of degradation or change possible due ageing of that component over the 25 year lifetime of the equipment.

Another problem which has been identified is that one of these complicated units may be declared failed in the field, and when the repair team at the factory examines it there may be no fault found. The original fault may be due to unique environmental or system conditions that may make the fault difficult to reproduce in the factory. Units are commonly returned with minimal or missing paperwork describing the failure conditions. Customers may even send units back as failed, just to get them upgraded to the latest version while still under warranty.

In the field of optical transmission systems, it is known to monitor and remote information about parameters, such as received optical power and bit error rates, that are important to the operating company. Central Operations Systems collect the data and threshold crossing alarms. The operating company may use this information to schedule preventative maintenance of the system. Bellcore TR-253 is a technical requirement for SONET systems, and indicates analog parameters that are monitored eg laser currents and reported to the operating company. However, there has not been monitoring of lower level parameters which are of no direct interest to the operating company.

Storage of parameters or programs in non-volatile memory (NVM), such as FLASH is also known. Transmission systems, computer terminals, and other such systems, may save provisioned values or configurations in non-volatile FLASH memory within a unit. These then become the default parameters upon powering up the unit. For example, a computer terminal may save the default bit-rate, the number of bits per character, and the ASCII parity selection. However, there has been no suggestion of using such memory for saving the details of the internal analog parameters of the electrical and optical components of a unit.

SUMMARY OF THE INVENTION

An aim of the invention is to provide an improved element or system or method which addresses the above problems.

According to an aspect of the invention there is provided a field replaceable element for handling data traffic within an optical transmission system, the element comprising:
  self testing means for measuring a parameter related to the performance of the element;
  non volatile storage means for storing data derived from an output of the self testing means; and
  means for retrieving the stored data from the non volatile storage means.

By providing non volatile storage, on board, for test results, it becomes easier to monitor parameters over long periods under field conditions, and conditions at the time of a fault can be stored to assist in diagnosing the cause of faults, when the element is returned to the factory for repair.

If the element is an optical amplifier there will be time varying parameters whose actual variation is difficult to predict without field experience information.

If the parameter is an analog parameter, rather than a digital one, it is likely to be processed using components whose performance may degrade with time. The invention is particularly beneficial in such cases.

Advantageously a statistical summary of the test measurements is made on board before storage. This is one way of reducing the amount of data for storage, while retaining the essential information.

Advantageously issuance of an alarm triggers storage of data, so that diagnosis of the fault can be assisted by storage of information relating to conditions up to or just after the time of the fault.

Advantageously derived data is stored at periodic intervals.

Advantageously it is stored securely so as to prevent unauthorised retrieval. Thus performance information which can be commercially sensitive, can be kept from competing hardware manufacturers, even when the element is in the field and out of the control of the manufacturer.

According to another aspect of the invention there is provided an element for handling data traffic within an optical transmission system comprising:
  self testing means for measuring an analog parameter relating to the internal operation of the element for reporting only to authorised hardware maintenance personnel; means for storing an output of the self testing means; and processing means for deriving a statistical summary of the output of the self testing means over a predetermined time period.

By creating a statistical summary of the stored test outputs, the essential information can be retained, and limited storage space reused for storing test outputs during the next predetermined time period.

Advantageously, a system for gathering self test data incorporates a number of the abovementioned elements and derives field experience information from statistical summaries gathered by a central processing unit from the elements.

Advantageously an optical transmission system is provided comprising at least one of the abovementioned elements.

According to another aspect of the invention, there is provided a method of operating an element for handling data traffic in an optical transmission system, comprising the steps of
  using a self test means to measure an analog parameter relating to the internal operation of the element, for reporting only to authorised hardware maintenance personnel;
  storing an output of the self test means on board the element; and
  deriving on board a statistical summary of the output of the self test means over a predetermined time period.

The preferred features discussed above can be combined as appropriate.

BRIEF DESCRIPTION OF THE DRAWINGS

For a better understanding of the invention and to show how the same may be carried into effect, it will now be described by way of example with reference to the accompanying drawings, in which.

DETAILED DESCRIPTION

Optical amplifier units, and other high speed transmission units commonly can be controlled by a micro-processor within the unit. All of the main control loops and parameter monitoring can be done by that micro-processor using A/D and D/A converters.

It is common that the control instructions for that microprocessor are stored on the same card in FLASH EEPROM or other nonvolatile memory.

An example of the method of the invention accumulates statistics about the critical analog parameters of the card each second, and then saves a monthly summary into FLASH. For the first alarm declared within a 24 hour period, such as Unit Fail, the details of the alarm and the current parameter values are similarly saved into FLASH. Being non-volatile, these saved records can be examined later in the factory, or can be remotely accessed while the unit is still in service. If non-volatile, they will survive interruptions in power supply to the card. One reason for triggering storage only on the first alarm in a period such as 24 hours is to avoid the memory being filled by a toggling alarm. Unused space in the program memory can be used, or separate storage space provided.

Figure 1:
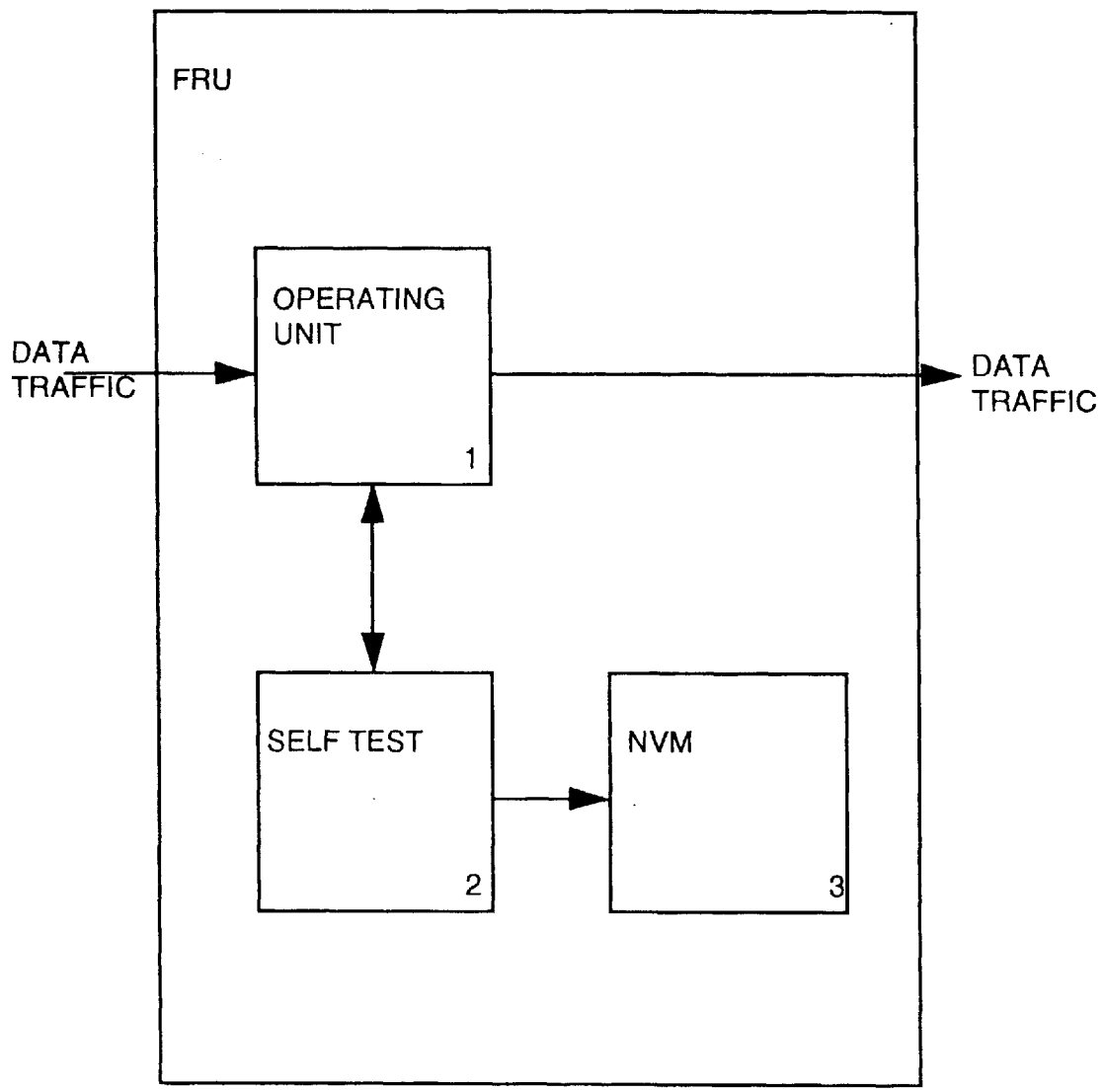
FIG. 1 shows in schematic form a field replaceable element for an optical transmission system having features of the invention.

FIG. 1 shows in schematic form a field replaceable unit (FRU), constituting an element in an optical transmission system. The element could be an optical receiver, a transmitter, a regenerator, or an optical amplifier. An operating unit 1 is shown in the data path. This is connected to a self-test means 2. The self-test means 2 feeds a non-volatile memory (NVM) 3. The self-test means 2 may be constituted by the same microprocessor and A/D and D/A converters used to perform control of the operating unit 1.

The non-volatile memory 3 may be constituted by the nonvolatile memory provided for storing control programs for the microprocessor. Means for retrieving data from the non-volatile memory may be constituted by the on-board micro processor reading the data from the non-volatile memory and transmitting it off the FRU, typically a single card, to a remote location. Alternatively, the data may be stored securely on the non-volatile memory so as to prevent unauthorised retrieval, perhaps by using pass word control, or by preventing reading at all by the micro processor of the section of memory containing the test data. In this case, dedicated test equipment could be used at the factory when the card is returned for repair to read out the test data from the non-volatile memory.

Figure 2:
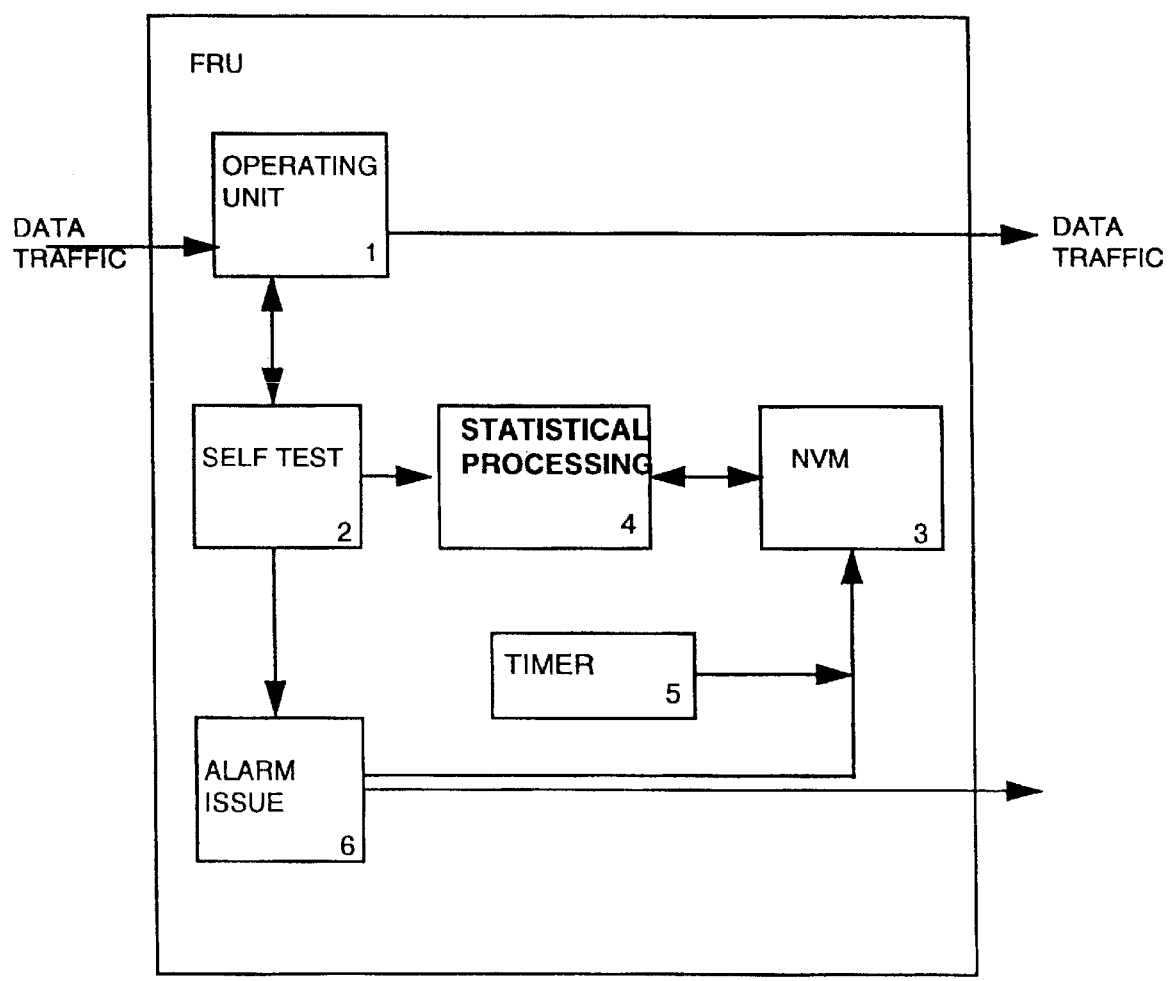
FIG. 2 shows in schematic form another field replaceable element having features of the invention.

FIG. 2 shows in schematic form a similar field replaceable unit to that shown in FIG. 1, but further comprising a statistical processing means 4, a timer 5, and an alarm issuing means 6. The statistical processing means and the alarm issuing means can be constituted by the same micro processor which is used to control the operating unit 1. The statistical processing function can act on data direct from the self test function, or can operate on data stored in non-volatile memory or other memory. Examples of the statistical processing can cover obtaining maximums or minimums of parameters over predetermined time periods, as well as obtaining values for means or sigma. Such processing can enable essential information to be extracted from large quantities of test data, so that limited non-volatile storage space can be used efficiently.

The timer 5 may be provided for triggering an interrupt in the micro processor for example, to ensure that the statistical summaries of information are stored for given predetermined time periods. Storage of these summaries may also be triggered by the issue of an alarm by the alarm issue means 6.

Figure 3:
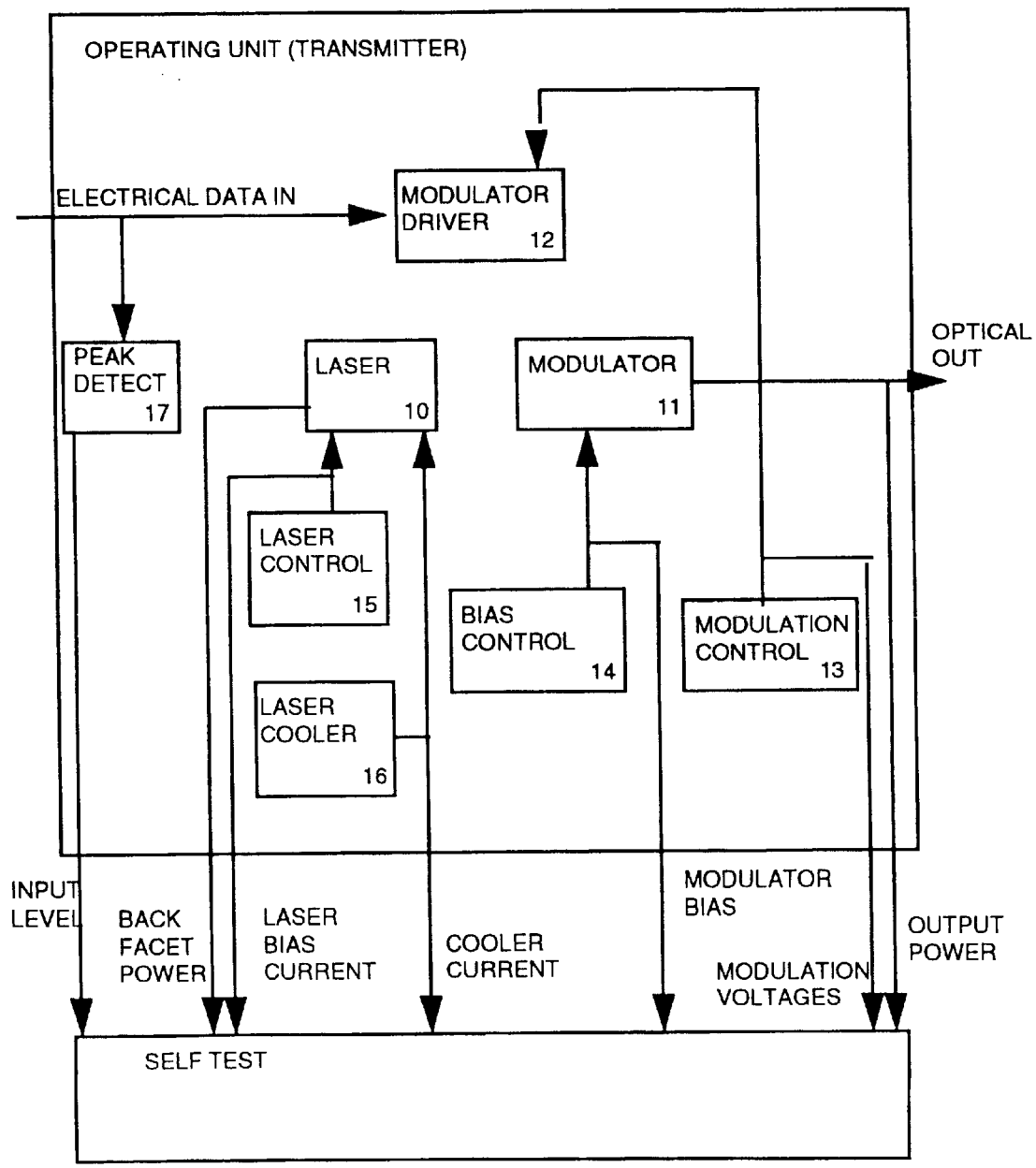
FIG. 3 shows in schematic form an example of the operating unit of FIG. 1 or FIG. 2.

FIG. 3 shows an operating unit in schematic form, as an example of the type of operating unit which may be used in the embodiments of FIGS. 1 and 2. It is a transmitter for an optical transmission system, and includes a laser 10 and a modulator 11 for producing an optical signal modulated by a data stream. A modulator driver 12 is provided, controlled by a modulation control means 13. The modulator also has an input from a bias control means 14. The laser has inputs from a laser control means 15 and a laser cooler means 16. Finally, a peak detect circuit 17 is provided for the electrical data input.

All the control functions may be carried out in practice by a micro processor, using A/D and D/A converters as appropriate. In this case, the values fed to the self test function may be already available within the micro processor. As shown in FIG. 3, the principal values being fed to the self test function include output power, modulation voltage, modulator bias, cooler current, laser bias current, back facet power, and data input peak detect. There may well be many other values according to the type of operating unit and the components which form the operation unit. For example, if new devices are incorporated, then more inputs and outputs of the new device may be of interest, and be fed to the self test function.

Figure 4:
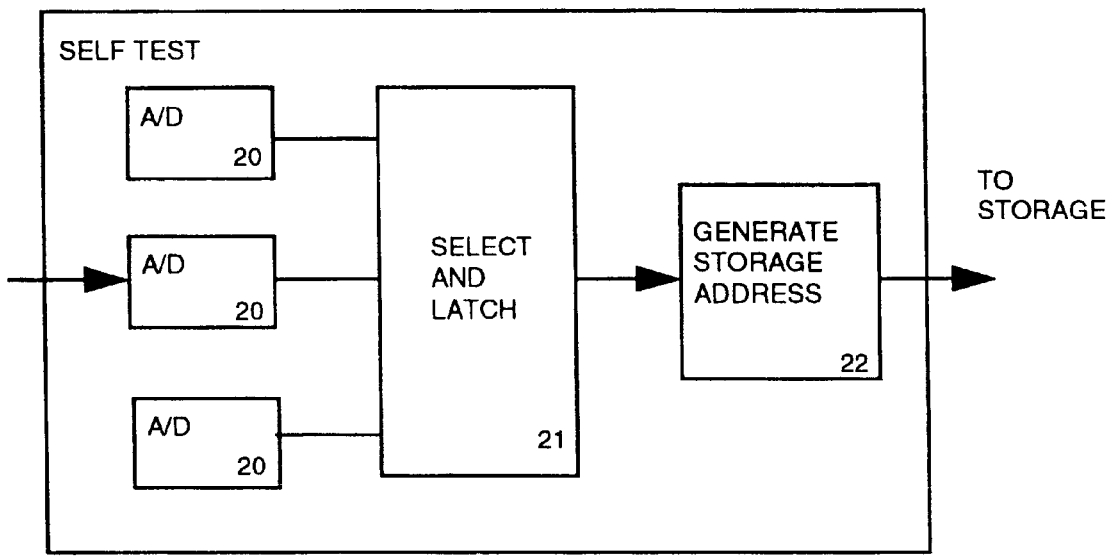
FIG. 4 shows in schematic form the self test function of FIG. 1 or FIG. 2.

FIG. 4 shows a schematic diagram of the self test function. A/D converters are shown, though these may be constituted by A/D circuits already provided for the feedback and control functions of the operating unit.

Hence, the self test means shown in FIG. 4 includes numerous A/D converters 20, a select and latching function 21, and a storage address generation function 22. The selecting function can optionally be carried out before the A/D conversion, which would reduce the number of A/D converters required. The address generation for storage would normally be carried out by the micro processor.

Figure 5:
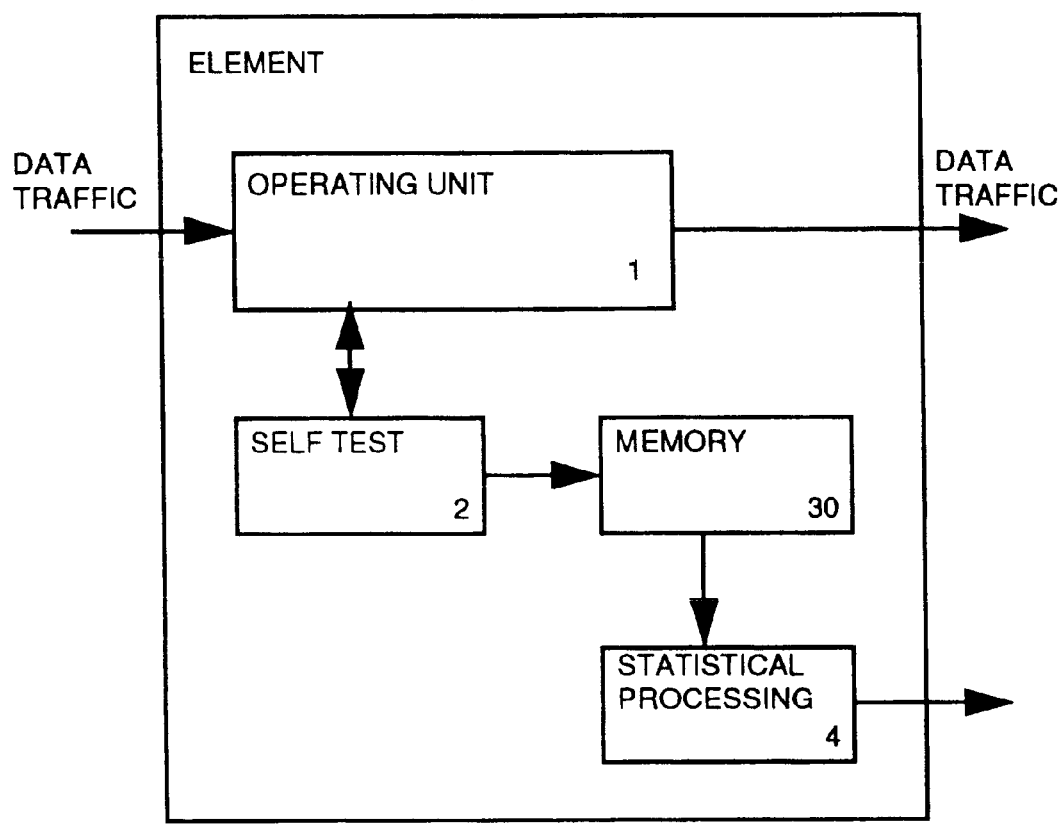
FIG. 5 shows in schematic form an element of an optical transmission system showing features of the invention and FIG. 6 shows in schematic form a system for gathering self test data, showing features of the invention.

FIG. 5 shows in schematic form an element of an optical transmission system including an operating unit 1, self test means 2, and memory 30. A statistical processing means 4 is also shown. The memory need not be a non-volatile memory in this case. The statistical processing takes place on data stored in the memory 30 over a period of time. The results of the statistical processing may be stored on board the element, optionally in non-volatile memory, or may be transmitted immediately to be stored elsewhere. Having the statistical processing on board the element, and operating on stored self test results, enables essential information to be extracted from large quantities of self test results. Thus the on board memory can be reused each given time period, and transmission and storage requirements for the essential information derived statistically, can be reduced.

Figure 6:
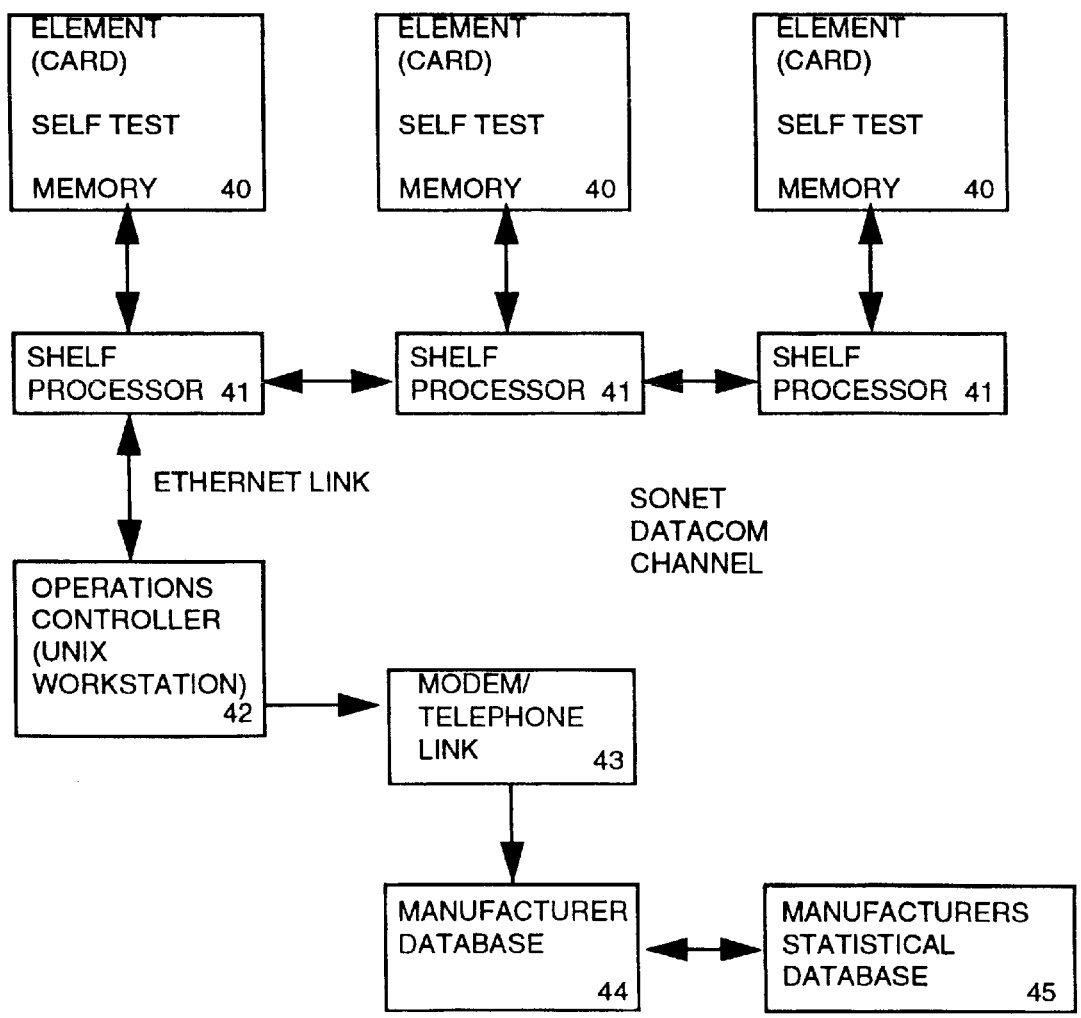

FIG. 6 shows a system for gathering self test data including a number of elements 40, each connected to a shelf processor 41. The shelf processors are typically linked by a SONET datacom channel. At least one of the shelf processors may be connected by an ethernet link to an operations controller 42, typically a UNIX workstation. This will in turn be linked by a modem/telephone link 43 to a manufacturer's database 44 typically at a remote location. Means for carrying out statistical processing 45 on the manufacturer's database is also shown.

Each of the elements may optionally have means for deriving statistical summaries, and the statistical processing means 45 can further process the received statistical summaries to derive field experience information for each of the measured parameters. For example, if a statistically large sample of elements have a particular component which is sensitive to power supply voltage variations, field experience information in the form of actual outputs over a range of voltages could be derived. If the variation over the sample of devices over a period of field usage is better than expected, it might be possible to lower the power supply quality requirements and reduce costs or power more units from the same supply.

Although the shelf processors 41, the operations controller 42, and the modem/telephone link 43 can be used to communicate automatically, the self test results, or the statistical summaries, in principle, the same function can be achieved by manual removal of the element and physical transfer of the element to the site of the manufacturer, perhaps for repair, where it could be linked directly to the manufacturer's database to enable the self test results to be added to the database.

As a detailed example, there follows a description of the storage trigger and items to be saved in NVS when applying the invention to a conventional element such as an Optical Amplifier as marketed by Northern Telecom. The trigger for saving a block in Flash memory can be a once per month timer signal, or Unit fail alarm, and previous unit fail triggered save was more than 24 hours before, or it is 15 minutes after a restart and the previous restart trigger was more than 24 hours before.

Information

Detailed alarm states

Provisioned values, eg card configuration data, or use preferences.

Time and date, trigger reason, time since reset

Firmware version

Flash region booted from

Pump Current statistics since last save:
   max, min, mean, sigma, n, updated inside an audit task each 128 ms, and accumulated as five 32 bit integers and then those five values in saved block reset the accumulation if output reprovisioned Output Power statistics since last save:
   max, min, mean, sigma, n, gain_changed reset the accumulation if reprovisioned Input Power statistics since last save:
   max, min, means, sigma, n, gain_switched reset the accumulation if gain switch Peak Detector value statistics since last save:
   max, min, mean, sigma, Bias voltage statistics since last save:
   max, min, mean, sigma, n Modulation voltage statistics since last save:
   max, min, mean, sigma, n Analog maintenance results max, min, mean, sigma, n (see U.S. Pat. No. 5,513,029 Roberts et al for an explanation of Analog maintenance and Dither values)

Dither values statistics since last save:
   max, min, mean, sigma, n

Temperature max, min, mean, sigma, n max delta, min delta

Cooler Current max, min, mean, sigma, n

CW laser current max, min, mean, sigma, n

Back facet monitor currents max, min, mean, sigma, n

Power supply voltages max, min, mean, sigma, n

−48 voltage values A and B max, min, mean, sigma, n

Self check values max, min, mean, sigma, n

Of these, information such as pump current, output power, input power and laser current have been known to be requested by a user 45 or operating company. Thus they can either be transmitted off the card to an operations control computer, or this computer should be advised of the storage location and given access on demand.

However, values such as bias voltage, modulation voltage, cooler current, and power supply voltages relate to the internal operation of the element and thus could be made inaccessible without authorisation, eg by encryption, or by password controlled access. Implementation of these and other ways are well known and will not be described further.

The preferred method is an inexpensive addition to an optical transmission system that provides a non-volatile record of the health of the unit, the history of key device parameters, and the detailed failure condition. It does not disturb the traffic, and can be read at the factory or remotely monitored while in the field. Statistical data on device parameter changes can be gathered from the entire field population of units. With this, a design team can tighten the tolerances on the parameter values in the designs, and so guarantee better performance. This method also assists a factory repair team in repairing a returned unit by providing full, unambiguous, and objective data about the failure conditions.

This method is usually not visible to the operating company, and is not generally intended for preventative maintenance. This method is usually tied to a specific unit, and is not for monitoring performance of a whole system. The purpose for and the preferred implementations of this method are quite different from performance monitoring of a transmission system.

Other variations will be apparent to one skilled in the art, within the scope of the claims.

What is claimed is:

1. A field replaceable element for handling data traffic within an optical transmission system, the element comprising:
   on board non volatile storage;
   self test circuitry for detecting long term variations in an internal parameter related to the performance of the element other than the data traffic and
   circuitry for storing data relating to the long term variations detected by the self test circuitry in the non volatile storage.

2. The element of claim 1 wherein the element comprises an optical amplifier.

3. The element of claim 1 wherein the internal parameter is an analog parameter.

4. The element of claim 1 further comprising circuitry for deriving a statistical summary of the output of the self test circuitry.

5. The element of claim 1 comprising circuitry for issuing an alarm and wherein issuance of the alarm triggers storage of said data derived from the output of the self test circuitry.

6. The element of claim 1 wherein: the data derived from the output of the self test circuitry is stored in the non volatile storage means at periodic intervals.

7. The element of claim 1 wherein the derived data is stored in the non volatile storage securely, to prevent unauthorised retrieval.

8. An element for handling data traffic within an optical transmission system, the element comprising:
   self test circuitry for detecting long term variations in an analog parameter relating to internal operation of the element; circuitry for storing an output of the self test circuitry processing means for deriving a statistical summary of the output of the self test circuitry over a predetermined time period, and a non volatile store for storing the statistical summary on board the element, for reporting the statistical summary only to authorized hardware maintenance personnel.

9. The element of claim 8 wherein the self test circuitry is arranged to measure at least five analog parameters.

10. The element of claim 8 further comprising an optical amplifier.

11. The element of claim 8 wherein the analog parameter comprises a power supply voltage.

12. A system for gathering self test data, comprising a plurality of the elements of claim 8, the system further comprising:
    a central processing circuitry for receiving statistical summaries of the measured analog parameter from the plurality of elements, and for deriving field experience information for the measured parameter, and circuitry for transmitting the derived statistical summaries from each element to the central processing circuitry.

13. An optical transmission system including an element as set out in claim 1, and comprising an optical path, a transmitter for transmitting data traffic along the optical path, and a receiver for receiving the data traffic transmitted along the optical path.

14. An optical transmission system including an element as set out in claim 8, and comprising an optical path, a transmitter for transmitting data traffic along the optical path, and a receiver for receiving the data traffic transmitted along the optical path.

15. A method of operating an element for handling data traffic in an optical transmission system, comprising the steps of
    using a self test circuitry to measure an analog parameter relating to internal operation of the element;
    storing an output of the self test circuitry on board the element;
    deriving on board a statistical summary of the output of the self test circuitry over a predetermined time period and storing in non volatile form on board the element, the statistical summary, for reporting the statistical summary only to authorized hardware maintenance personnel.

* * * * *